United States Patent [19]

McCullough et al.

[11] Patent Number: 5,403,603
[45] Date of Patent: Apr. 4, 1995

[54] CEREAL COOKER CONTROL METHOD AND APPARATUS

[75] Inventors: Nancy J. McCullough; James E. Willbur; Ronald H. Keagle; Leon R. Harris, all of Battle Creek, Mich.

[73] Assignee: Kraft General Foods, Inc., Northfield, Ill.

[21] Appl. No.: 120,042

[22] Filed: Sep. 10, 1993

[51] Int. Cl.⁶ .................. A23L 1/00; G01N 33/00
[52] U.S. Cl. .................. 426/233; 99/342; 99/353; 426/448; 426/449
[58] Field of Search .......... 426/233, 448, 449, 523; 99/342, 353, 486; 73/714

[56] References Cited

U.S. PATENT DOCUMENTS 4,187,727  2/1980  Bhimji ............................ 73/714
4,211,163  7/1980  Brown et al. .................... 426/448

Primary Examiner—George Yeung
Attorney, Agent, or Firm—Thomas A. Marcoux; Thomas R. Savoie

[57] ABSTRACT

A control process and apparatus enable operation of a pressurized continuous cereal cooker and discharge auger with decreased steam utilization. An electric motor advances the cooked cereal mass through a pressurized zone comprising a quick-opening valve, preferably a butterfly valve. The current drawn by the electric motor is monitored to sense the accumulation of cooked cereal mass at the valve. A process signal, representative of the current drawn by the motor, is compared to a reference signal, representative of a selected value representative of a current higher than that required to turn an empty auger. A control signal based on the comparison of the first signal and the reference signal is then generated to open or close the valve in response to the control signal. When the process signal drops below the reference signal, the valve is closed.

9 Claims, 3 Drawing Sheets

CEREAL COOKER CONTROL METHOD AND APPARATUS

TECHNICAL FIELD

The invention relates to improvements in the control of cereal cookers, of the type used to continuously cook cereal formulations such as those containing bran, to lessen energy consumption with high reliability and good product quality.

Cereal doughs are conventionally cooked as an initial step in the preparation of ready-to-eat breakfast cereals. Typically, doughs containing bran and/or other cereal ingredients are cooked, divided into small pieces, and finally shaped, such as by flaking. Continuous cookers employed for this purpose often comprise a controllable auger to feed mixed syrup and dry ingredients through a pressurized mixing and cooking chamber. Steam and, if necessary, water are introduced into the pressurized chamber in quantities sufficient to completely hydrate the cereal.

The cooker operates best at superatmospheric pressure and feeds the cooked cereal dough—still under pressure—sequentially, to augers which convey the dough and feed it to size-reducing equipment which creates bits or pellets of a suitable size and shape for the next stage in processing.

The dough is prepared under pressure and must be depressurized at some point. Typically, this is accomplished as it passes from the cooker auger through a pressure lock to a conveyor at ambient pressure. Unfortunately, the pressure locks currently available for food cookers waste considerable quantities of steam, are high in initial cost, require shutting down the equipment for frequent cleaning, and are difficult to maintain.

BACKGROUND ART

In the prior art system which preceded the development of the present invention, a pressure lock was positioned below the cooker auger and received cooked cereal dough from a continuous cooker. The pressure lock maintained the elevated pressure on the dough in the cooker. The dough was discharged from the cooker through the pressure lock to size-reducing equipment operated at ambient pressure. The lock comprised a lock auger, a large cylindrical metal rotor, and a fixed housing which held the rotor. The rotor was a heavy metal cylinder having a plurality of spaced holes bored through the rotor, having central axes equidistantly spaced from the center of rotation of the rotor. The holes were separated by the solid mass of the rotor. Each of the holes was of about the same diameter as a passage from the lock auger to the size-reducing equipment. The distances between the holes were at least sufficient to block off the noted passage.

The rotor was turned continuously within the fixed housing, with the rate of rotation adjusted to best approximate the actual need for opening and closing. In the open position, the rotor was turned about its center of rotation sufficiently to permit one hole in the rotor to align with the passage from the lock auger. In the closed position, the rotor was oriented so that the solid rotor surface between the holes, blocked the passage. Between these two positions, the lock was neither fully open nor fully closed.

While the above device has operated successfully for many years, it has been observed that great quantities of steam are lost due to the manner of opening and closing the pressurized passage. Indeed, because the locks opened on a timed cycle, they opened whether or not food was present. Moreover, frictional forces caused excessive wear of the parts and, if cleaning was not rigorous, cereal dough could become caked on the equipment where it burned and flaked off into the cereal as unsightly dark spots. Investigations of various equipment makers to find a suitable replacement were not successful.

Accordingly, there is a present need for an improved pressure lock to permit discharge of cereal doughs from continuous cookers without the problems of the prior art.

SUMMARY OF THE INVENTION

It is an object of the invention to provide an improved pressure lock and control system to permit discharge of cereal doughs from continuous cookers while reducing losses of steam to the atmosphere.

It is an object of the invention to provide an improved pressure lock and control system to permit discharge of cereal doughs from continuous cookers while reducing the cost of operation caused by frictional wear on expensive metal parts.

It is an object of the invention to provide an improved pressure lock and control system to permit discharge of cereal doughs from continuous cookers while reducing the cost of operation by minimizing the need to shut down the equipment to clean the lock.

It is an object of the invention to provide an improved pressure lock and control system to permit discharge of cereal doughs from continuous cookers while reducing losses of steam to the atmosphere, reducing the cost of operation caused by frictional wear on expensive metal parts, and reducing the cost of operation by minimizing the need to shut down the equipment to clean the lock.

These and other objects are achieved by the invention which provides both a method and an apparatus to control the discharge of cooked cereal product from a pressurized screw-fed cereal cooker.

The process of the invention comprises the steps of: advancing, by means of an auger driven by an electric motor, a cooked cereal mass through a pressurized zone; monitoring the current drawn by the electric motor to sense the accumulation of cooked cereal mass at a lock valve; generating a process signal representative of the current drawn by the motor and, therefore, the presence of the material at the lock valve; comparing the process signal to a reference signal representative of a selected value representative of a current higher than that required to turn an empty auger; generating a control signal based on the comparison of the process signal and the reference signal; and, opening or closing said valve in response to said control signal. Preferably, the valve is a quick-opening valve, such as a butterfly valve.

The apparatus according to the invention comprises: an electric motor for driving an auger to advance a cooked cereal mass through a pressurized zone; a quick-opening valve; means for monitoring the current drawn by the electric motor to sense the accumulation of cooked cereal mass at the valve; means for generating a process signal representative of the current drawn by the motor and, therefore, the presence of the material at the valve; means for comparing the process signal to a reference signal representative of a selected value representative of a current higher than that required to turn an empty auger; means for generating a control signal based on the comparison of the process signal to the reference signal; and means for opening or closing said valve in response to said control signal.

DESCRIPTION OF THE DRAWINGS

The invention will be better understood and its advantages will be more apparent when the following detailed description is read in light of the accompanying drawings, wherein.

INDUSTRIAL APPLICABILITY AND BEST MODE

The following description centers on the processing of a bran cereal mass by a process scheme as illustrated in the Figures. It will be understood that different equipment than that described and different starting materials may change the conditions described.

Figure 1:
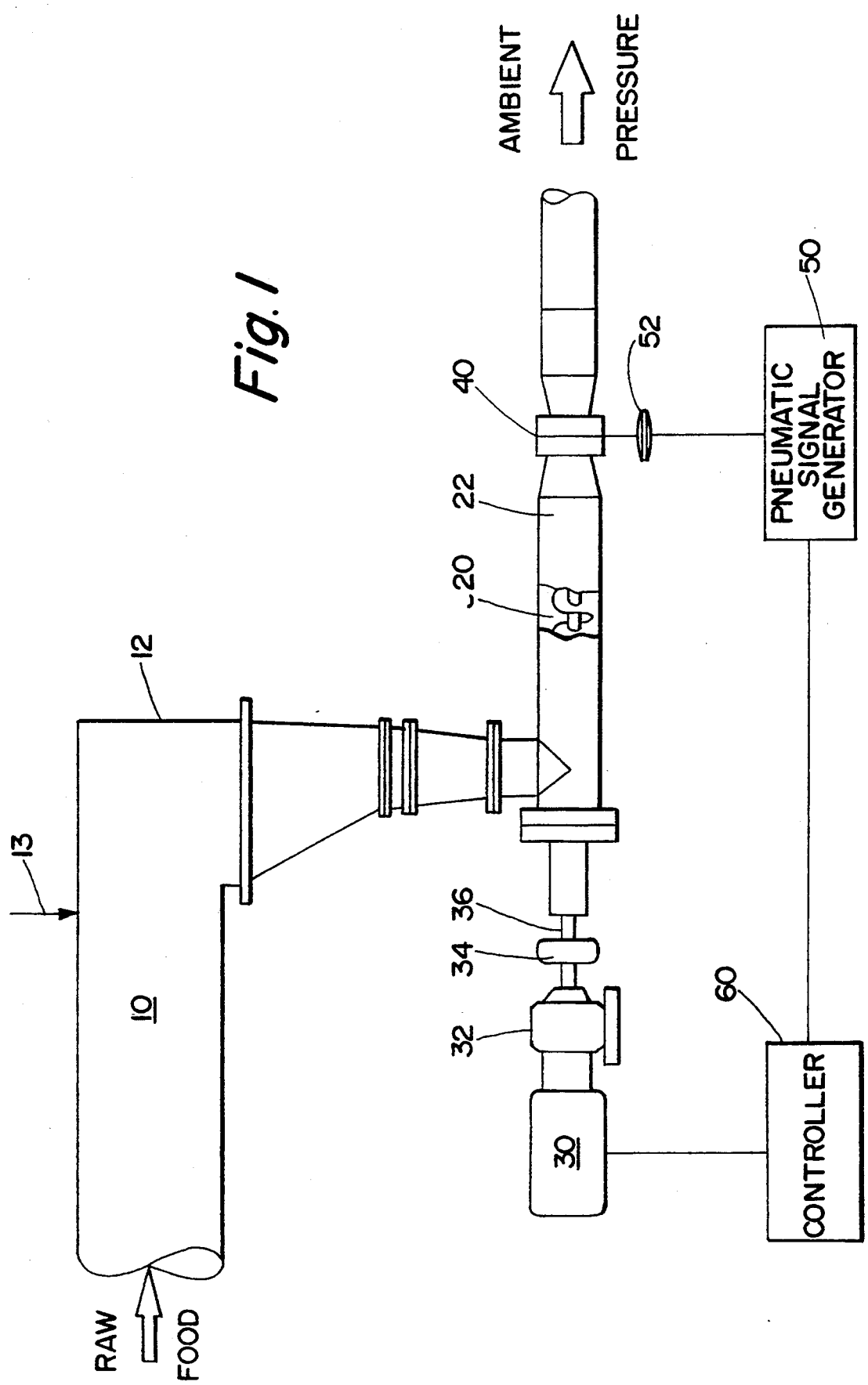
FIG. 1 is a schematic representation of one embodiment of the invention wherein the discharge of cooked cereal mass from a pressurized zone is controlled by monitoring the current drawn by an electric motor which drives an auger to advance the mass to a lock valve.
Figure 2:
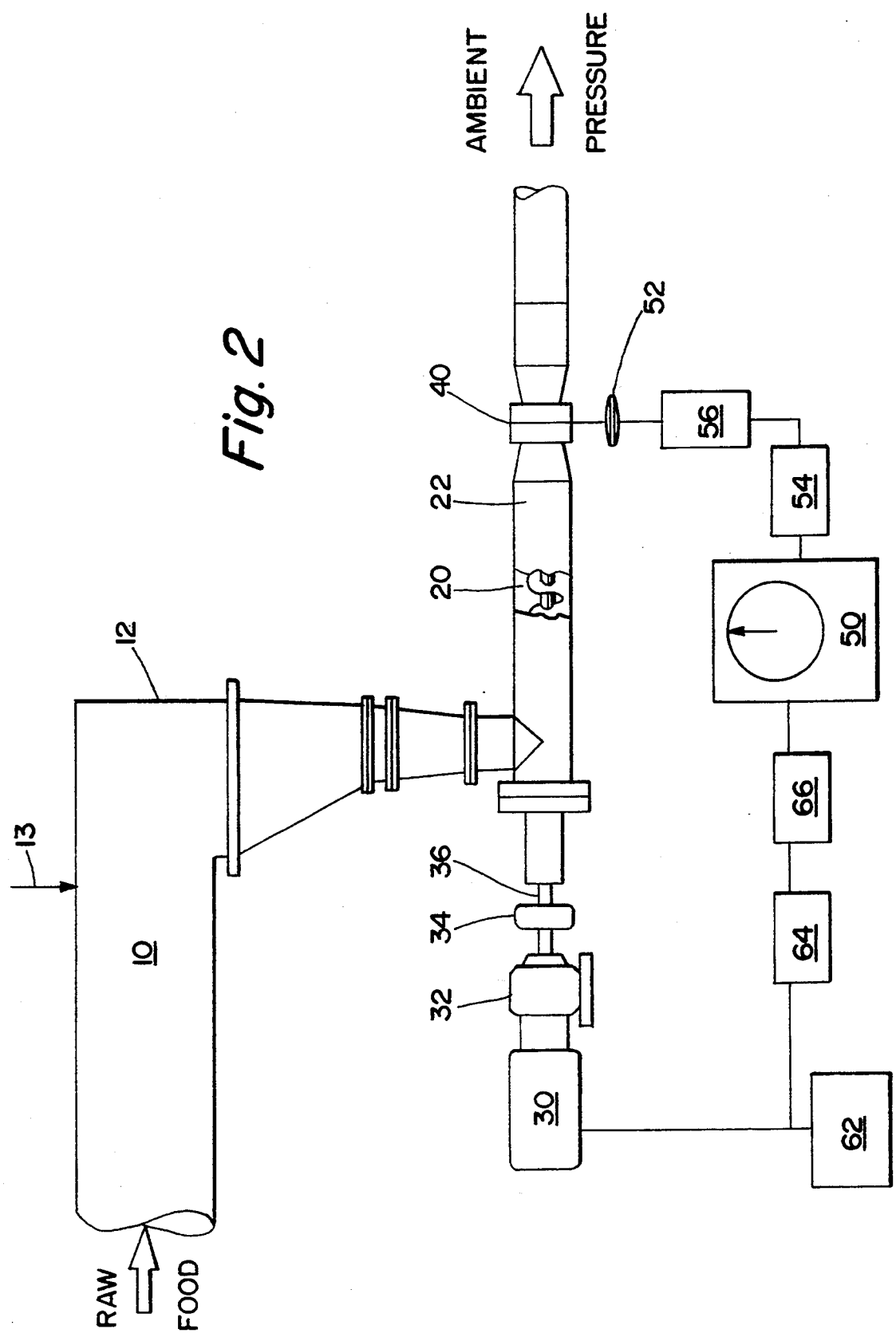
FIG. 2 is a view similar to FIG. 1, but showing one preferred control arrangement.

The control process and apparatus illustrated in FIGS. 1 and 2 enable operation of a pressurized continuous cereal cooker 10 and discharge auger 20 with decreased steam utilization. The cereal cooker is preferably of the kind employing a screw (i.e., auger) to mix the ingredients and advance the resulting mixture from a feed end (not shown) to a discharge end shown generally as 12. The cooker is fed pressurized steam via one or more lines such as 13. The steam is added, e.g. at about 25 psig or as otherwise required, to supply some of the moisture for hydration of the ingredients and heat for the cooking. If desired, the cooker can have a heated jacket. The selection of the temperature of the cooker and the speed of the auger will depend on the material being processed. For most cereal formulations, the temperature will be within the range of from about 230° to about 350° F., and the auger will be rotated at a speed sufficient to obtain a residence time of from about 20 to about 25 minutes.

Upon completion of the cooking operation, the food drops from the cooker to a lock auger 20 of the lock also under pressure, to advance the material through a lock valve and into suitable conveyor and size-reduction or other equipment. FIG. 1 illustrates a lock auger 20 maintained in a jacket 22 (partially cut away to reveal the auger) which continues the pressurized zone begun in the cooker. An electric motor 30, by operable engagement with transmission 32, coupling 34, and shaft 36, drives the lock auger 20 within the pressurized zone. The lock auger 20 advances a cooked cereal mass through the pressurized zone up to a lock valve 40.

The lock valve 40 can comprise any suitable quick-opening valve. The valve is preferably a butterfly valve because of its good operating characteristics with the viscous dough masses and its tendency to stay clean with little maintenance. However, other types of valves such as ball valves, gate valves, and Red Jacket valves, can be employed. The valve is preferably operated pneumatically, such as by a pneumatic control signal generated by a suitable pneumatic signal generator 50 which sends pressurized air as necessary to operate a pneumatic valve actuator 52. FIG. 1 shows a generalized situation where the pneumatic signal generator 50 receives a control signal from a controller 60. FIG. 2 shows a specific embodiment in greater detail.

The signal generator 50 can be of any suitable kind. One suitable signal generator comprises a Moore Products 77 I/P converter which receives an electrical current signal from a controller and converts this to a pneumatic signal such as can be monitored by a Moore Products Pneumatic Indicating Control Station and compared to a reference value. When the reference value is exceeded, the control station then sends a pneumatic signal, which can be boosted (boosters 54 and 56 in FIG. 2), to the pneumatic valve actuator 52.

The measurement of pressure within a cereal extruder, or the like, has heretofore been problematic (see, in this regard, U.S. Pat. No. 4,187,727). Cereal doughs tend to block passages or tubes and to encrust diaphragms. The control system of the invention effectively monitors the pressure at the lock valve 40, without the usual problems. As the auger 20 feeds cooked cereal material to the lock valve 40, the presence of the material at the lock valve causes back pressure to rapidly build on the auger. This, in turn makes it harder for the motor 30 to turn the auger 20 and requires the input of higher current. The current drawn by the electric motor is monitored by a suitable controller 60 to sense the accumulation of cooked cereal mass at the lock valve 40.

The controller 60 generates a process signal representative of the current drawn by the motor, and therefore indicative of the pressure on the mass as it is forced against the valve 40. The use of a controller to set and maintain motor speed, such a Magnatec frequency drive (62 in FIG. 2), permits monitoring the output current of the drive to the lock motor 30. The signal in one embodiment is initially taken off as a voltage and is simply converted to one in milliamps by a device such as an Action Pack voltage to current converter (64 in FIG. 2). This signal can then be easily converted to a pneumatic process signal ($I_P$) by a current-to-pressure transducer such as a Moore Products 77 I/P (66 in FIG. 2).

Figure 3:
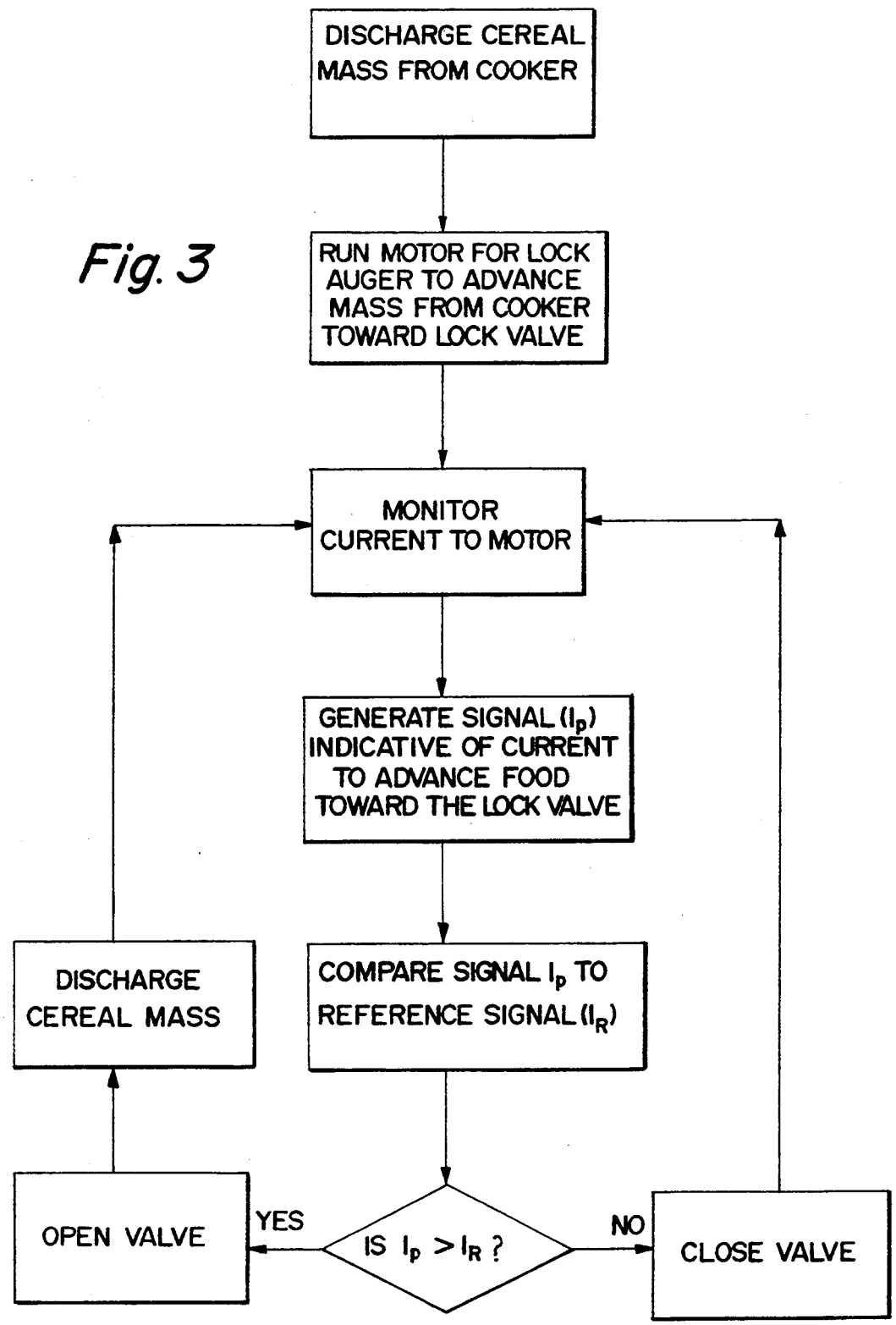
FIG. 3 is a flow diagram illustrating the control system of the invention.

The process signal ($I_P$) is compared to a reference signal ($I_R$), representative of a selected current which, if exceed, indicates that pressure next to the lock valve is increasing due to the presence of food and that the valve should be opened. A control signal based on the comparison of the process signal and the reference signal is then generated, such as by a Moore Products Pneumatic Indicating Control Station, to open or close the valve in response to the control signal. The logic of this control system is illustrated in FIG. 3.

When the signal is given to open the lock 40, pneumatic valve actuator 52 causes the valve to open and permits the cooked cereal mass to be forced out. The arrow represents the discharge of the cooked cereal mass and its movement toward size-reducing equipment which does not form part of this invention and is not shown. When the current to the motor drops to below the reference level, the lock 40 is again closed.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

We claim:

1. A process for controlling the discharge of cooked cereal mass from a pressurized cereal cooker, comprising the steps of:
   (a) operating an electric motor to drive an auger and thereby advance a cooked cereal mass through a pressurized zone in a pressure lock comprising a quick-opening valve;
   (b) monitoring the current drawn by the electric motor to sense the accumulation of cooked cereal mass at the lock;
   (c) generating a process signal representative of the current drawn by the motor and, thereby, the presence of cereal mass at the valve;
   (d) comparing the process signal to a reference signal representative of a selected value representative of a current higher than that required to turn an empty auger;
   (e) generating a control signal based on the comparison of the process signal and the reference signal; and
   (f) opening or closing said valve in response to said control signal.

2. A process according to claim 1, wherein the valve is a butterfly valve.

3. A process according to claim 1, which further includes the step of controlling the speed of the electric motor.

4. An apparatus for controlling the discharge of cooked cereal mass from a cereal cooker which employs an electric motor operatively engaged with an auger for rotating the auger to advance a cooked cereal mass through a pressurized zone, comprising:
   (a) a quick-opening valve;
   (b) means for monitoring the current drawn by the electric motor to sense the accumulation of cooked cereal mass at the valve;
   (c) means for generating a process signal representative of the current drawn by the motor;
   (d) means for comparing the process signal to a reference signal representative of a selected value representative of a current higher than that required to turn an empty auger;
   (e) means for generating a control signal based on the comparison of the process signal and the reference signal; and
   (f) means for opening or closing said valve in response to said control signal.

5. An apparatus according to claim 4, wherein the valve is a butterfly valve.

6. An apparatus according to claim 4, which further includes means for controlling the speed of the electric motor.

7. An apparatus according to claim 4 wherein the means for opening and closing the valve comprise a pneumatic signal generator and a pneumatic valve actuator.

8. An apparatus according to claim 7, wherein the valve is a butterfly valve.

9. An apparatus for controlling the discharge of cooked cereal mass from a pressurized screw-fed cereal cooker, comprising:
   (a) an electric motor operatively engaged with an auger for rotating the auger to advance a cooked cereal mass through a pressurized zone;
   (b) means for controlling the speed of an electric motor;
   (c) a quick-opening, pneumatically-operated butterfly valve;
   (d) means for monitoring the current drawn by the electric motor to sense the accumulation of cooked cereal mass at the valve;
   (e) means for generating a process signal representative of the current drawn by the motor;
   (f) means for comparing the process signal to a reference signal representative of a selected value representative of a current higher than that required to turn an empty auger;
   (g) means for generating a control signal based on the comparison of the process signal and the reference signal; and
   (h) means comprising a pneumatic signal generator and a pneumatic valve actuator for opening or closing said valve in response to said control signal.

* * * * *